(12) United States Patent
Elgressy et al.

(10) Patent No.: US 6,553,498 B1
(45) Date of Patent: *Apr. 22, 2003

(54) METHOD AND SYSTEM FOR ENFORCING A COMMUNICATION SECURITY POLICY

(75) Inventors: Doron Elgressy, Haifa (IL); Asher Jospe, Natanya (IL)

(73) Assignee: Computer Associates Think, Inc., Islandia, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 09/625,927

(22) Filed: Jul. 26, 2000

Related U.S. Application Data

(63) Continuation of application No. 09/184,871, filed on Nov. 3, 1998, now Pat. No. 6,098,173.

(30) Foreign Application Priority Data

Nov. 27, 1997 (IL) ................................................ 122314

(51) Int. Cl.⁷ .................. G06F 11/30; G06F 12/14; G06F 15/16; G06F 9/00
(52) U.S. Cl. ................ 713/201; 713/202; 709/203; 709/316
(58) Field of Search ............... 713/202, 201, 713/200; 709/203, 316, 202, 317, 315, 328

(56) References Cited

U.S. PATENT DOCUMENTS

| | | | |
|---|---|---|---|
| 5,692,047 A | 11/1997 | McManis | 380/4 |
| 5,699,513 A | 12/1997 | Feigon et al. | |
| 5,757,914 A | 5/1998 | McManis | 380/23 |
| 5,903,732 A * | 5/1999 | Reed et al. | 395/200.59 |
| 5,928,323 A * | 7/1999 | Gosling et al. | 709/203 |
| 5,940,590 A | 8/1999 | Lynne et al. | 395/186 |
| 5,970,145 A | 10/1999 | McMannis | 380/23 |
| 5,974,549 A | 10/1999 | Golan | 713/200 |
| 5,983,348 A | 11/1999 | Ji | 713/200 |
| 6,219,706 B1 * | 4/2001 | Fan et al. | 709/225 |
| 6,282,581 B1 * | 8/2001 | Moore et al. | 709/316 |
| 6,289,462 B1 * | 9/2001 | McNabb et al. | 713/201 |
| 2001/0011298 A1 * | 8/2001 | Gosling et al. | 709/203 |

FOREIGN PATENT DOCUMENTS

EP     0 776 112 A2     5/1997

OTHER PUBLICATIONS

Sharon Machlis: "Screening for Applets", Computerworld, vol. 31, No. 6, Feb. 10, 1997, USA, p. 51–52.

* cited by examiner

Primary Examiner—Norman M. Wright
(74) Attorney, Agent, or Firm—Cooper & Dunham LLP

(57) ABSTRACT

A method for enforcing a security policy for selectively preventing the downloading and execution of undesired Executable Objects in an individual workstation, comprising the steps of, (1) providing a security agent suitable to be installed in an individual workstation, said security agent being provided with means for introducing at least one marker in one or more data packet transmitted by a workstation to a server through a gateway, said at least one marker indicating that a security agent is installed in the transmitting workstation; (2) providing means in or coupled to the gateway for analyzing the first one or more data packet(s) received from a transmitting workstation initiating communication to a remote server, to determine whether said first one or more data packet(s) comprise at least one marker indicating that a suitable security agent is installed in the transmitting workstation; (3) If at least one marker indicating that a suitable security agent is installed in the transmitting workstation is detected in said first one or more data packet(s), deleting said marker(s) from said first one or more data packet(s), and allowing said data packet(s) to be transmitted to their destination; and (4) If no marker indicating that a suitable security agent is installed in the transmitting workstation is detected in said first one or more data packet(s), preventing any data packet(s) received from the server to which the workstation is connected from being transmitted to the workstation.

22 Claims, 2 Drawing Sheets

METHOD AND SYSTEM FOR ENFORCING A COMMUNICATION SECURITY POLICY

CROSS-REFERENCED TO RELATED APPLICATION

This application is a continuation of application Ser. No. 09/184,871 filed Nov. 3, 1998 now U.S. Pat. No. 6,098,173 entitled "Method and System for Enforcing a Communication Security Policy".

FIELD OF THE INVENTION

The present invention relates to the security management of computer networks. More particularly, the invention relates to methods and systems for preventing the downloading and execution of undesirable Executable Objects in a workstation of a computer network.

BACKGROUND OF THE INVENTION

The Internet has developed very much both in respect of its contents and of the technology employed, since it began a few years ago. In the early days of the Internet, web sites included text only, and after a while graphics was introduced. As the Internet developed, many compressed standards, such as pictures, voice and video files, were developed and with them programs used to play them (called "players"). Initially, such files were downloaded to the user's workstation only upon his request, and extracted only by the appropriate player, and after a specific order from the user.

When, in the natural course of the development of the World Wide Web the search for a way to show nicer, interactive and animated Web Pages began, Sun Microsystems Inc. developed Java—a language that allows the webmaster to write a program, a list of commands—Network Executables—that will be downloaded to the user workstation without his knowledge, and executed by his browser at his workstation. The executables are used, e.g., to provide photographic animation and other graphics on the screen of the web surfer. Such executables have ways of approaching the user workstation's resources, which lead to a great security problem. Although some levels of security were defined in the Java language, it was very soon that a huge security hole was found in the language.

Since Java was developed, Microsoft developed ActiveX, which is another Network Executable format, also downloaded into the workstation. ActiveX has also security problems of the same kind.

The Internet has been flooded with "Network Executables" which may be downloaded—deliberately or without the knowledge of the users—into workstations within organizations. These codes generally contain harmless functions. Although usually safe, they may not meet the required security policy of the organization.

Once executed, codes may jam the network, cause considerable irreversible damage to the local database, workstations and servers, or result in unauthorized retrieval of information from the servers/workstations. Such elements may appear on Java applets, ActiveX components, DLLs and other object codes, and their use is increasing at an unparalleled pace. The majority of these small programs are downloaded into the organization unsolicited and uncontrolled. The enterprise has no way of knowing about their existence or execution and there is no system in place for early detection and prevention of the codes from being executed.

The security problem was solved partially by the browser manufactures which allow the user to disable the use of executables. Of course this is not a reasonable solution, since all the electronic commerce and advertising are based on the use of executables. The security problem is much more serious once such an executable can approach the enterprise servers, databases and other workstations. However, so far the art has failed to provide comprehensive solutions which are safe and quick enough to be practically useful. Systems such as "Firewall" or "Finjan", distributed for use by Internet users, provide only partial solutions and, furthermore, are difficult to install and to update.

In two copending patent applications of the same applicants hereof, IL 120420, filed Mar. 10, 1997, and IL 121815, filed Sep. 22, 1997, the descriptions of which are incorporated herein by reference, there are described methods and means for preventing undesirable Executable Objects from infiltrating the LAN/WAN in which we work and, ultimately, our workstation and server. However, while the systems described in the aforementioned two Israeli patent applications are safe and convenient to use, they present a drawback when very large organizations are concerned, inasmuch as they require that each individual user (or workstation) be controlled to ensure that it operates according to the desired security policy or, in other words, that he has installed in the workstation appropriate security data, or they require that control of the security policy be carried out centrally at the gateway level, rather than at the workstation level. Thus, in large organizations where new users are constantly added, policing the maintenance of the security policy requires constant management efforts, if the security agent is to be installed on the individual workstations. As will be appreciated, installing the security agent on the individual workstation provides many advantages, particularly where speed of operation and cost of central equipment is concerned, and where a centralized security enforcement is needed.

SUMMARY OF THE INVENTION

It is an object of the present invention to provide a method and means for enforcing the security policy of an organization on each and every member of the organization, thereby selectively preventing the downloading and execution of undesired Executable Objects in a computer, which obviates the need for the continuous central management and monitoring of the activities of the individuals within the organization, and which permits to effect a part of the security policy enforcement process on the individual workstations of the organization.

It is another object of the invention to provide such a system which is easy to install and which can be quickly and easily updated.

It is a further object of the invention to provide such a method which can be used with a large number of gateways, LAN's and workstations.

It is yet another object of the invention to provide such a security management system which is independent of the physical infrastructure and network layout.

Also encompassed by the invention is a computer system which utilizes the method of the invention.

The invention is directed to a method for enforcing a security policy for selectively preventing the downloading and execution of undesired Executable Objects in an individual workstation, comprising the steps of:

(1) providing a security agent suitable to be installed in an individual workstation, said security agent being provided with means for introducing at least one marker in one or more data packet transmitted by a workstation to a server through a gateway, said at least one marker indicating that a security agent is installed in the transmitting workstation;

(2) providing means in or coupled to the gateway for analyzing the first one or more data packet(s) received from a transmitting workstation initiating communication to a remote server, to determine whether said first one or more data packet(s) comprise at least one marker indicating that a suitable security agent is installed in the transmitting workstation;

(3) If at least one marker indicating that a suitable security agent is installed in the transmitting workstation is detected in said first one or more data packet(s), deleting said marker(s) from said first one or more data packet(s), and allowing said data packet(s) to be transmitted to their destination; and (4) If no marker indicating that a suitable security agent is installed in the transmitting workstation is detected in said first one or more data packet(s), preventing any data packet(s) received from the server to which the workstation is connected from being transmitted to the workstation.

Details of the security policies, their distribution to various gateways within the organization, and the analysis of received data, are described in detail in said copending Israeli patent applications of the same applicant herein, the description of which is incorporated herein by reference, and are therefore not discussed herein in detail, for the sake of brevity.

According to a preferred embodiment of the invention, the method further comprises the step of obliging the workstation which has transmitted data packet(s) which do not contain a marker indicating that a suitable security agent is installed therein, to install a suitable security agent. In this way, the security policy is enforced in real time. Furthermore, as will be further discussed below, if the security agent installed is outdated, and the marking information received at the gateway shows this fact, installation of an updated security agent, or an updating of the security policy information, can also be forced on the user. Such installation (which, as used herein, also includes updating of outdated security policy data) can either be carried out automatically by the system, or interactively, in cooperation with the user of the workstation.

According to a preferred embodiment of the invention, when installation of a security agent is needed, a packet containing an HTML PAGE comprising installation information for the security agent is returned to the workstation by the gateway or by means coupled to it, such as in a form of an E-MAIL and file attachment.

Furthermore, according to a preferred embodiment of the invention, the identity of the workstation and/or of the user is compared with the security level to be allocated to it/him, and the suitable security agent and/or security policy data to be installed in the workstation are selected.

The invention also encompasses a system for enforcing a security policy for selectively preventing the downloading and execution of undesired Executable Objects in an individual workstation comprising:

A. A security agent suitable to be installed in an individual workstation, said security agent being provided with means for introducing at least one marker in one or more data packet transmitted by a workstation to a server through a gateway, said at least one marker indicating that a security agent is installed in the transmitting workstation;

B. Gateway means for controlling the communication traffic of a plurality of workstations with the Internet or an intranet;

C. Detection means provided in, or coupled to said gateway for analyzing the first one or more data packet (s) received from a transmitting workstation initiating communication to a remote server, to determine whether said first one or more data packet(s) comprise at least one marker indicating that a suitable security agent s installed in the transmitting workstation;

D. Means for deleting said marker(s) from said first one or more data packet(s), and for allowing said data packet(s) to be transmitted to their destination, if at least one marker indicating that a suitable security agent is installed in the transmitting workstation is detected by said detection means in said first one or more data packet(s); and E. Means for preventing any data packet(s) received from the server to which the workstation is connected from being transmitted to the workstation if no marker indicating that a suitable security agent is installed in the transmitting workstation is detected by said detection means in said first one or more data packet(s).

According to a preferred embodiment of the invention, the system further comprises means for allowing or forcing the installation of a suitable security agent on a workstation. Such means may comprise means for obliging the workstation which has transmitted data packet(s) which do not contain a marker indicating that a suitable security agent is installed therein, to install a suitable security agent, which may be means for automatically installing the security agent on the workstation, or means for carrying out the installation interactively in cooperation with the user of the workstation.

According to a preferred embodiment of the invention there are provided means for returning to the workstation a packet containing an HTML PAGE comprising installation information for the security agent. Thus, according to this particular embodiment of the invention the workstation is connected through a link provided to it by the gateway, to a distant server which guides it in the installation procedure, and which provides the required information and software. In a preferred embodiment of the invention the installation is effected after comparing the identity of the workstation and/or of the user with the security level to be allocated to it/him, and selection of the suitable security agent and security policy data to be installed in the workstation.

Other advantages and objects of the invention will become apparent as the description proceeds.

DETAILED DESCRIPTION OF PREFERRED EMBODIMENTS

Figure 1:
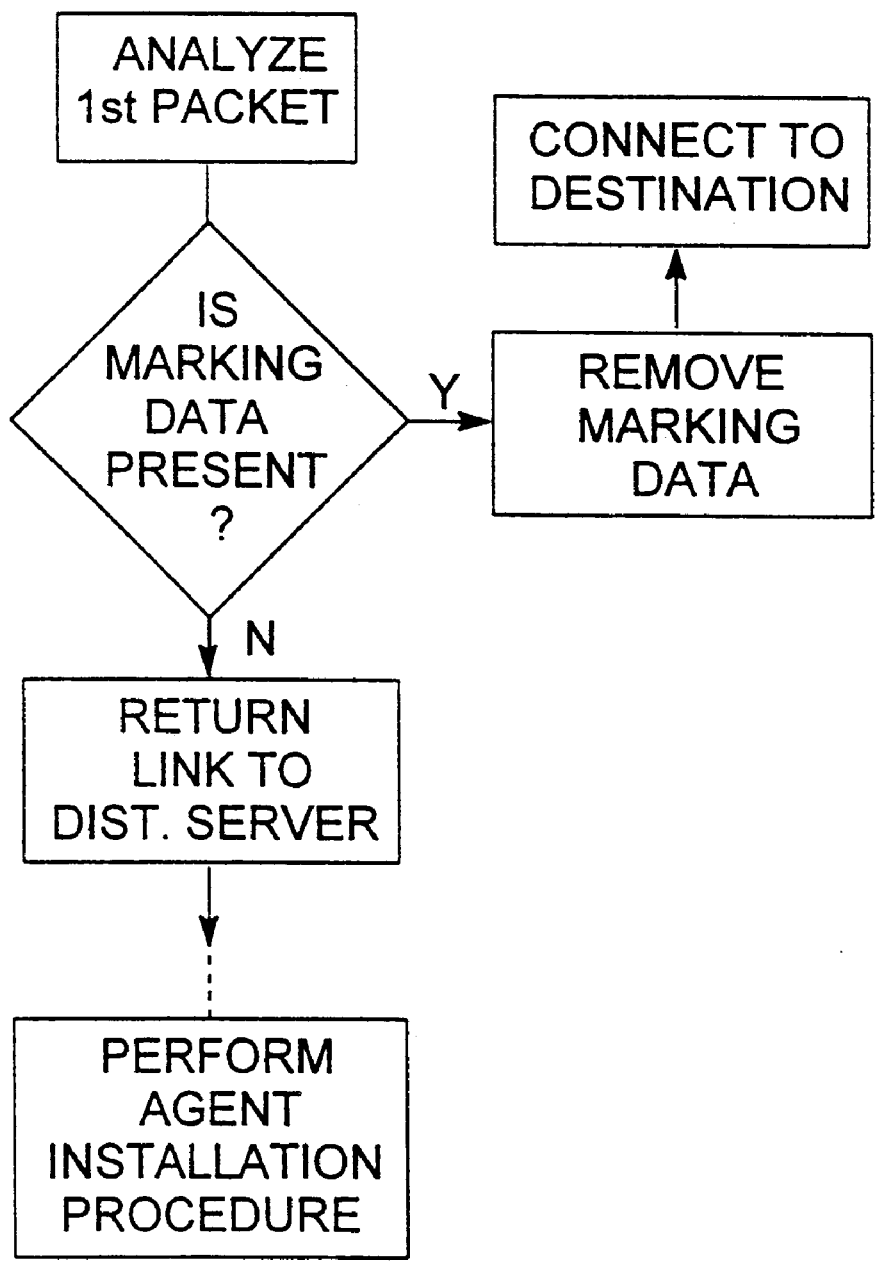
FIG. 1 is a schematic representation of a security policy enforcement process, according to a preferred embodiment of the invention.

The method of the invention operates together with the system of IL 120420 for selectively preventing the downloading and execution of undesired Executable Objects in a computer which, briefly, operates according to the following steps:

(a) providing one or more Control Centers, each connected to one or more gateways located between a LAN and an external computer communication network;

(b) providing means coupled to each of said gateways, to detect Executable Objects reaching said gateway, to analyze the header of each of said Executable Objects, and to determine the resources of the computer that the Executable Object needs to utilize;

(c) providing means coupled to each of said gateways, to store a user's Security Policy representing the resources, or combination of resources, that the user allows or does not allow an Executable Object to utilize within its LAN, wherein the Security Policy is received from and/or stored in each of said one or more Control Centers;

(d) when an Executable Object is detected at the gateway:
1. analyzing the header of said Executable Object;
2. determining the resources of the computer that the Executable Object needs to utilize;
3. comparing the resources of the computer that the Executable Object needs to utilize with the Security Policy and;
    (i) if the resources of the computer that the Executable Object needs to utilize are included in the list of the resources allowed for use by the Security Policy, allowing the Executable Object to pass through the gateway and to reach the computer which has initiated its downloading; and
    (ii) if the resources of the computer that the Executable Object needs to utilize are included in the list of the resources prohibited for use by the Security Policy, preventing the Executable Object from passing through the gateway, thereby preventing it from reaching the computer which has initiated its downloading.

A Control Center (CC) may be a central control unit, e.g., a PC or other computer, which is connected to a plurality of gateways, and which updates the memory means containing relevant date, e.g., the Security Policy. As will be understood from the description to follow, once the CC is updated, e.g., by the addition of an additional limitation to the Security Policy, all gateways are updated at once. The use of the CC to control the operation of the security elements of the gateways obviates the need (which exists in prior art systems) to update each gateway every time that a change in policy is made.

A LAN (Local Area Network) may be (but is not limited to), e.g., a network of computers located in an office or building. The LAN is typically connected to outside communications networks, such as the World Wide Web, or to more limited LANs, e.g., of a client or supplier, through one or more gateways. The larger the organization, the larger the number of gateways employed, in order to keep communications at a reasonable speed.

Generally speaking, a LAN can also be made of a plurality of smaller LANs, located geographically nearby or far apart, but even if small LANs are found within the same organization, the security requirements may vary from one department to the other, and it may be necessary to keep high security levels, including preventing Executables from migrating from one department to the other, even within the same organization.

The means coupled to each of said gateways, to detect Executable Objects reaching said gateway, to analyze the header of each of said Executable Objects, and to determine the resources of the computer that the Executable Object needs to utilize may be of many different types. Typically, the executable object is "trapped" and analyzed at the gateway by listening on the communication line to the communication protocols, such as the TCP/IP, NETBUI, IPX/SPX, or others, as well as to the object transfer protocols, such as SMTP, HTTP, FTP, NMTP, IMAP, etc. Hooking into the communication line and extracting the contents of the header of the executable object are steps which are understood by the skilled person, and which can be effected by means of conventional programming, and they are therefore not described herein in detail, for the sake of brevity.

Once the header of the Executable Object (EO) has been analyzed, comparing the resources of the computer that the EO needs to utilize with the Security Policy can be easily done, e.g., by comparing them with a look-up table provided to the gateway by the CC, which represents the Security Policy. Comparison can also be carried out against the data stored in the CC, and in such a case specific memory means and comparing means may not be necessary in the gateway. However, speed and performance considerations will often dictate that such operations be carried out at the gateway itself.

The gateway must be installed in each Internet server within the organization. It comprises a small real time database which contains all the relevant operational information for the gateway. The gateway "listens" to the data being transferred between the enterprise and the Internet. It knows when an object is coming into the LAN, it analyzes it and compares it with the Security Policy to decide what action is to be taken.

According to a preferred embodiment of IL 120420, as stated, if the resources of the computer that the Executable Object needs to utilize are included in the list of the resources allowed for use by the Security Policy, no steps are taken by the system to prevent the Executable Object from passing through the gateway and reaching the computer which has initiated its downloading. However, if the resources of the computer that the Executable Object needs to utilize are included in the list of the resources prohibited for use by the Security Policy, steps will be taken to prevent the Executable Object from passing through the gateway. Such steps may include, e.g., re-routing the executable to a destination outside the gateway, canceling or garbling part of it, so as to make it inoperative, etc.

The method is not limited to any specific EO. Illustrative examples of EO's include, inter alia, Java Applets, Active-X, OCX, Win32 Executables, DLLs, or the like executable objects. However, as will be apparent to the skilled person, EO's are constantly developed, and the actual nature of the EO is not of critical importance.

Many other features and advantages of the system are described in detail in the specification of IL 120420 which, as stated, is incorporated herein by reference.

According to the present invention there is provided the process according to which the user is obliged to install a security agent according to the security policy of the organization, whenever he attempts to connect to a server via the gateway. The gateway maybe any of a plurality of gateways existing in the organization.

The system operates as follows: whenever a user attempts to connect to a server, in order to access a target server on the Internet or in an intranet, a "connect process" is effected in which a first packet a is sent from the station to the target server, which packet does not contain data. According to the present invention private information is introduced into said first packet, which private information is termed hereinafter "Marking Information", which marking information indicates that an agent is present on the workstation that is attempting to connect. In other words, whenever the communication process is started by the user, if a security agent is present on the workstation, said security agent will modify the first packet so as to introduce marking information indicative of the fact that the agent is installed on the workstation. If no security agent is installed on the workstation, the first packet sent by the workstation during the connect process will be empty, or at least will not comprise any marking information indicative of the presence of a suitable security agent on the workstation. By means of the marking information the gateway, which is responsible for carrying out the security policy of the organization, will be alerted of the fact that a workstation on which no security agent has been installed is attempting to connect to a server outside of the Organization, or outside a segment of the Organization for which enforcement of the security policy is required.

This process is further illustrated in FIG. 1. In the figure, the operation of the gateway is schematically illustrated. The gateway, which receives all incoming and outgoing data packets, receives a first packet sent by a given workstation, and analyzes it. The gateway checks whether the first packet contains marking data, as defined above. If suitable marking data are found by the gateway, the gateway removes the marking data from the packet before allowing it to pass to its destination, so as not to interfere with any analysis made on the packet at the receiving end. The gateway then allows the workstation to connect to its destination.

If a gateway cannot detect marking data in the first packet, it does not allow the workstation to connect to its destination and, in place of connecting it to its desired destination, it returns to the workstation a link to a distant server, which server contains the required software for performing a forced installation of a security agent on the specific workstation. Forced installation of a software, such as the security agent, can be effected in a variety of ways, which are apparent to the skilled person, and which are therefore not describe herein in detail, for the sake of brevity. Such installation maybe carried out using programs written in the Java language, in any other suitable way, or even interactively with the user, by advising him that he will not be allowed to connect through the gateway unless he performs specific required operations which will lead to the installation of the desired security agent on his workstation.

According to a preferred embodiment of the invention, the connection of the user to the server which will perform the installation of the security agent on the user's workstation, or from which the user will carry out the installation following instructions given to him, is effected by allowing the empty packet sent by the user to the gateway (viz., the first packet which does not contain marking information) to reach the destination server, and, when a response packet is received from the destination server, addressed to the user, the gateway replaces it with a packet which contains an a HTTP PAGE, which contains the information for the installation of the security agent.

Of course, additional procedures can be used in order to obtain the same result. For instance, a less convenient, more primitive—but still effective, procedure comprises analyzing the first packet at the gateway, as explained above, and then returning to the user or to the security administrator just a notification that his workstation is not allowed to connect through the gateway, because no security agent is installed thereon. Such notification may include information as to where, or from whom, the software needed for installing the security agent may be obtained. While this is a less convenient, more lengthy and time-consuming procedure, as it will be apparent to the skilled person, it is nonetheless as effective as any other more advanced installation procedure, for the purposes of maintaining security, and observing the security policy of the organization. According to another preferred embodiment of invention, an analysis of the identity of the workstation and/or of the user is also effected by the gateway and/or by the distant server, to determine the security policy that applies to him. This is important in organizations which apply differentiated security policies, e.g., where different departments, or different individuals or levels within a departments, are assigned different security policies. Such a step is of course not necessary if the entire organization employs a uniform security-policy.

Figure 2:
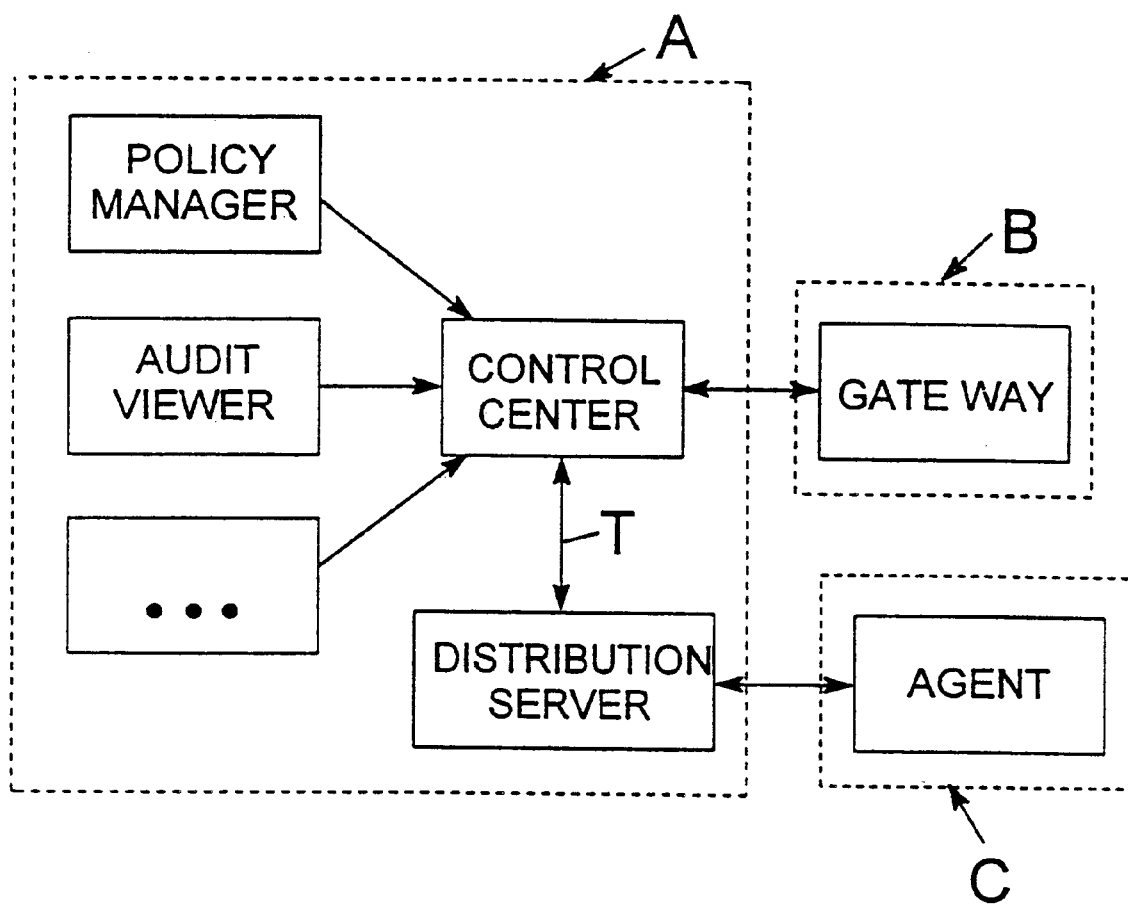
FIG. 2 further illustrates the various elements of a system according to one preferred embodiment of the invention, and the relationship between them.

Looking now at FIG. 2, three security levels of a system according to a preferred embodiment of the invention are illustrated. Box "A" is the management applications block, which contains the Control Center which controls all security operations of the system. The Control Center is connected to management modules, such as the Policy Manager, which contains data on the security policy of the system for the various gateways, users, etc., or the Audit Viewer, which permits an operator to view the operation of the system in real time, or any other utility which it may be desired to operate at the Control Center level (schematically indicated in the figure as the " . . ." box.

The Control Center is connected on the one hand to the Distribution Server, and on the other hand to one or more gateways (one gateway only being shown in the figure, for the sake of simplicity), The Distribution Server, which belongs to the management application block, is connected to the Control Center via TCP/IP (or packet level) connections, and has the function of providing operating information and data for the security agent operating at the workstation level. The Agent (box C) is logically connected, as said, on the one hand to the Distribution Server, and on the other hand to the gateway, which is provided with Gateway Level security applications (block B), which take care of the security operations which are carried out at the gateway itself, as explained above.

All the above description of preferred embodiments has been provided for the sake of illustration, and is not intended to limit the invention in any way, except as defined by the claims. Many modifications may be effected in the invention. For instance, many different markings can be provided to indicate that a security agent is installed on a given workstation, different types of analyses can be carried out by or at the gateway, or by different agents coupled to the gateway, and many different means and methods for effecting the installation of the security agent in a workstation can be provided, all without exceeding the scope of the invention.

What is claimed is:

1. A method for selectively preventing individual workstations connected to a network from transmitting data to other networks, the method comprising:

analyzing, at a gateway, data packets transmitted by a workstation and intended for another network; and determining whether at least one of the data packets transmitted by the workstation includes a marker, the marker indicating that a security agent resides in the workstation, such that when at least one of the data packets includes the marker the data packets are allowed to be transmitted via the gateway to the other network, and such that when at least one of the data packets does not include the marker the data packets are prevented from being transmitted via the gateway to the other network.

2. The method according to claim 1 further comprising installing a security agent in the workstation when at least one of the data packets does not include the marker.

3. The method according to claim 2, wherein the security agent installed is dependent upon a workstation identity and a user security level.

4. The method according to claim 2, wherein the security agent installation is automatically performed.

5. The method according to claim 2, wherein the security agent installation is performed interactively with a user of the workstation.

6. The method according to claim 1 further comprising generating an information packet that includes information for installing a security agent when at least one of the data packets does not include the marker, transmitting the information packet to the workstation, and installing a security agent in the workstation when the information packet is received by the workstation.

7. A system for selectively preventing individual workstations connected to a network from transmitting data to other networks, the system comprising:

an analyzer associated with a gateway and configured to analyze at a gateway data packets transmitted by a workstation that are intended for another network;

a detector associated with the analyzer and capable of determining whether at least one of the data packets transmitted by the workstation and analyzed by the analyzer includes a marker, the marker indicating that a security agent resides in the workstation; and a selector associated with the gateway and capable of allowing data packets to be transmitted via the gateway to the other network when at least one of the data packets includes the marker and preventing data packets from being transmitted via the gateway to the other network when at least one of the data packets does not include the marker.

8. The system according to claim 7 further comprising a security agent installer capable of installing the security agent in the workstation when at least one of the data packets does not include the marker.

9. The system according to claim 8, wherein the security agent installed is dependent upon a workstation identity and a user security level.

10. The system according to claim 8, wherein the security agent installer automatically installs the security agent.

11. The system according to claim 8, wherein the security agent installer installs the security agent interactively with a user of the workstation.

12. The system according to claim 8 wherein the installer generates an information packet that includes information for installing a security agent when at least one of the data packets does not include the marker, and transmits the information packet to the workstation.

13. The system according to claim 12 wherein the security agent is installed in the workstation when the information packet is received by the workstation.

14. A system for selectively preventing individual workstations connected to a network from transmitting data to other networks, the system comprising:

means for analyzing at a gateway data packets transmitted by a workstation that are intended for another network;

means for determining whether at least one of the data packets transmitted by the workstation includes a marker, the marker indicating that a security agent resides in the workstation; and means for allowing data packets to be transmitted via the gateway to the other network when at least one of the data packets includes the marker, and for preventing data packets from being transmitted via the gateway to the other network when at least one of the data packets does not include the marker.

15. The system according to claim 14 further comprising means for installing the security agent in the workstation when at least one of the data packets does not include the marker.

16. The system according to claim 15, wherein the security agent installed is dependent upon a workstation identity and a user security level.

17. The system according to claim 15, wherein the means for installing the security agent automatically installs the security agent.

18. The system according to claim 15, wherein the means for installing the security agent installs the security agent interactively with a user of the workstation.

19. The system according to claim 15 wherein the means for installing the security agent generates an information packet that includes information for installing the security agent when at least one of the data packets does not include the marker, and transmits the information packet to the workstation.

20. The system according to claim 19 wherein the security agent is installed in the workstation when the information packet is received by the workstation.

21. A method for enforcing a security policy for selectively preventing the downloading and execution of undesired executable objects in an individual workstation, comprising the steps of:

adding at least one marker to one or more data packet(s) of a set of data packets transmitted to a workstation through a gateway, said at least one marker indicating that the data packets have been generated by a workstation or server provided with a security agent;

providing means in or coupled to the gateway for analyzing the first one or more data packet(s) addressed to a workstation, to determine whether said first one or more data packet(s) comprise at least one such marker;

if at least one such marker is detected in said first one or more data packet(s), allowing said data packet(s) to be transmitted to their destination; and if no such marker is detected in said first one or more data packet(s), preventing any data packet(s) in said set of data packets from being transmitted to the workstation.

22. A system for enforcing a security policy for selectively preventing the downloading and execution of undesired executable objects in an individual workstation, comprising:

gateway means for controlling the communication traffic of a plurality of workstations connected via the Internet or an intranet;

detection means provided in, or coupled to said gateway for analyzing the first one or more data packet(s) of a set of data packets transmitted to a workstation initiating communication with a remote server, to determine whether said first one or more data packet(s) comprise at least one marker indicating that the data packets have been generated by a workstation or server provided with a security agent; and means for preventing any data packet(s) received from a server or workstation from being transmitted to the workstation to which they are addressed if no marker indicating that a security agent is installed in the transmitting workstation or server is detected by said detection means in said first one or more data packet(s).

* * * * *